US012431059B2

(12) United States Patent
Kim et al.

(10) Patent No.: US 12,431,059 B2
(45) Date of Patent: Sep. 30, 2025

(54) GATE DRIVING CIRCUIT AND DISPLAY APPARATUS INCLUDING THE SAME

(71) Applicant: Samsung Display Co., LTD., Yongin-si (KR)

(72) Inventors: Kyungho Kim, Yongin-si (KR); Sang Yong No, Yongin-si (KR); Gichang Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 2 days.

(21) Appl. No.: 18/519,808

(22) Filed: Nov. 27, 2023

(65) Prior Publication Data

US 2024/0312391 A1 Sep. 19, 2024

(30) Foreign Application Priority Data

Mar. 17, 2023 (KR) ........................ 10-2023-0035073

(51) Int. Cl.
*G09G 3/20* (2006.01)

(52) U.S. Cl.
CPC ..................... *G09G 3/2092* (2013.01); *G09G 2310/0267* (2013.01); *G09G 2310/0275* (2013.01); *G09G 2310/061* (2013.01); *G09G 2310/08* (2013.01)

(58) Field of Classification Search
CPC ......... G09G 3/2092; G09G 2310/0267; G09G 2310/0275; G09G 2310/061; G09G 2310/08; G09G 3/20; G09G 3/3266; G09G 3/3677; G09G 2320/043
See application file for complete search history.

(56) References Cited

U.S. PATENT DOCUMENTS

| | | | | |
|---|---|---|---|---|
| 11,574,598 | B2 * | 2/2023 | Chang | G09G 3/3266 |
| 2010/0134399 | A1 * | 6/2010 | Ki | G11C 19/184 345/94 |
| 2016/0210925 | A1 * | 7/2016 | Chung | G11C 19/28 |
| 2017/0249893 | A1 * | 8/2017 | Kim | G09G 3/3266 |
| 2017/0256217 | A1 * | 9/2017 | Xiao | G11C 19/28 |
| 2017/0256221 | A1 * | 9/2017 | Li | G09G 3/3677 |
| 2017/0323910 | A1 * | 11/2017 | Park | H10K 59/1216 |

(Continued)

FOREIGN PATENT DOCUMENTS

| | | | |
|---|---|---|---|
| KR | 102032383 | A | 11/2019 |
| KR | 1020200143618 | A | 12/2020 |

(Continued)

*Primary Examiner* — William Lu

(74) *Attorney, Agent, or Firm* — CANTOR COLBURN LLP

(57) ABSTRACT

A gate driving circuit includes: a first pull up control circuit for controlling a voltage of a pull up control node in response to a previous carry signal; a pull down control circuit for controlling a voltage of a pull down control node in response to the voltage of the pull up control node; a boosting circuit including a boosting capacitor and for boosting the voltage of the pull up control node; a gate output circuit for outputting a plurality of gate signals having different timings in response to the voltage of the pull up control node and the voltage of the pull down control node; and a stabilizing circuit including a control electrode connected to an end of the boosting capacitor, a first electrode for receiving a first high power voltage and a second electrode connected to the first pull up control circuit.

20 Claims, 9 Drawing Sheets

(56) References Cited

U.S. PATENT DOCUMENTS

| | | | | |
|---|---|---|---|---|
| 2018/0004238 | A1* | 1/2018 | Shen | G05F 1/462 |
| 2018/0114500 | A1* | 4/2018 | Jung | G09G 3/3688 |
| 2018/0122322 | A1* | 5/2018 | Ji | G11C 19/28 |
| 2018/0190205 | A1* | 7/2018 | Choi | G09G 3/3266 |
| 2018/0204495 | A1* | 7/2018 | Wang | G11C 19/287 |
| 2020/0389089 | A1* | 12/2020 | Hiasa | H02M 3/156 |
| 2020/0394968 | A1* | 12/2020 | Kwon | G09G 3/3266 |
| 2022/0108657 | A1* | 4/2022 | Feng | G09G 3/3677 |
| 2022/0208104 | A1* | 6/2022 | Chang | G09G 3/3258 |
| 2022/0208109 | A1* | 6/2022 | Seo | G09G 3/3233 |
| 2023/0360573 | A1* | 11/2023 | In | G09G 3/20 |
| 2024/0078958 | A1* | 3/2024 | No | G11C 19/28 |

FOREIGN PATENT DOCUMENTS

| | | | |
|---|---|---|---|
| KR | 1020220146730 | A | 11/2022 |
| KR | 1020220152460 | A | 11/2022 |
| KR | 1020220154316 | A | 11/2022 |

* cited by examiner

GATE DRIVING CIRCUIT AND DISPLAY APPARATUS INCLUDING THE SAME

This application claims priority to Korean Patent Application No. 10-2023-0035073, filed on Mar. 17, 2023 and all the benefits accruing therefrom under 35 U.S.C. § 119, the content of which in its entirety is herein incorporated by reference.

BACKGROUND

1. Field

Embodiments of the present invention relate to a gate driving circuit and a display apparatus including the gate driving circuit. More particularly, embodiments of the present invention relate to a gate driving circuit preventing a damage of a transistor due to a deterioration of the transistor, and accordingly enhancing a reliability and a display apparatus including the gate driving circuit.

2. Description of the Related Art

Generally, a display apparatus includes a display panel and a display panel driver. The display panel displays an image based on input image data. The display panel includes a plurality of gate lines, a plurality of data lines and a plurality of pixels. The display panel driver includes a gate driver and a data driver. The gate driver outputs gate signals to the gate lines. The data driver outputs data voltages to the data lines.

Some of transistors in the gate driver may be deteriorated according to waveforms of signals applied to the transistors of the gate driver and the levels of voltages applied to the transistors of the gate driver. When the deterioration of the transistor is severe, the transistor may be damaged. When the transistor is damaged, the reliability of the gate driver may be decreased.

SUMMARY

Embodiments of the present invention provide a gate driving circuit having an enhanced reliability.

Embodiments of the present invention also provide a display apparatus including the gate driving circuit.

In an embodiment of a gate driving circuit according to the present invention, the gate driving circuit includes: a first pull up control circuit, a pull down control circuit, a boosting circuit, a gate output circuit and a stabilizing circuit. The first pull up control circuit is configured to control a voltage of a pull up control node in response to a previous carry signal which is one of carry signals of previous stages. The pull down control circuit is configured to control a voltage of a pull down control node in response to the voltage of the pull up control node. The boosting circuit includes a boosting capacitor and is configured to boost the voltage of the pull up control node. The gate output circuit is configured to output a plurality of gate signals having different timings in response to the voltage of the pull up control node and the voltage of the pull down control node. The stabilizing circuit includes a control electrode connected to an end of the boosting capacitor, a first electrode configured to receive a first high power voltage and a second electrode connected to the first pull up control circuit.

In an embodiment, the first pull up control circuit may include a fourth switching element including a control electrode configured to receive the previous carry signal, a first electrode configured to receive the previous carry signal and a second electrode connected to the pull up control node.

In an embodiment, the fourth switching element may include two transistors connected to each other in series. The second electrode of the stabilizing circuit may be connected to an intermediate node of the two transistors of the fourth switching element which are connected to each other in series.

In an embodiment, the boosting circuit may further include a fifteenth switching element including a control electrode connected to the pull up control node, a first electrode configured to receive a boosting clock signal and a second electrode connected to a first node and a seventeenth switching element including a control electrode connected to the pull down control node, a first electrode configured to receive a second low power voltage and a second electrode connected to the first node. The boosting capacitor may include a first end connected to the first node and a second end connected to the pull up control node.

In an embodiment, a length of an active period of the boosting clock signal applied to the boosting circuit may be greater than a length of an active period of a first gate clock signal applied to the gate output circuit.

In an embodiment, the pull down control circuit may include a seventh switching element including a control electrode connected to the pull up control node, a first electrode configured to receive the second low power voltage and a second electrode connected to the pull down control node and an eight switching element including a control electrode configured to receive a next carry signal which is one of carry signals of next stages, a first electrode configured to receive a second high power voltage and a second electrode connected to the pull down control node.

In an embodiment, the seventh switching element may include two transistors connected to each other in series. The pull down control circuit may further include a twelfth switching element including a control electrode connected to the pull down control node, a first electrode configured to receive the second high power voltage and a second electrode connected to an intermediate node of the two transistors of the seventh switching element which are connected to each other in series.

In an embodiment, the gate driving circuit may further include a reset circuit configured to initialize the pull up control node and the pull down control node in response to a fourth control signal.

In an embodiment, the reset circuit may include a fifth switching element including a control electrode configured to receive the fourth control signal, a first electrode configured to receive a second high power voltage and a second electrode connected to the pull down control node and a sixth switching element including a control electrode configured to receive the fourth control signal, a first electrode configured to receive the second low power voltage and a second electrode connected to the pull up control node.

In an embodiment, the gate driving circuit may further include a carry output circuit configured to output a carry signal in response to the voltage of the pull up control node and the voltage of the pull down control node.

In an embodiment, the carry output circuit may include a sixteenth switching element including a control electrode connected to the pull up control node, a first electrode configured to receive a carry clock signal and a second electrode connected to a carry output node and an eighteenth switching element including a control electrode connected to the pull down control node, a first electrode configured to receive the second low power voltage and a second electrode connected to the carry output node.

In an embodiment, the gate driving circuit may further include a second pull up control circuit including a control electrode configured to receive a next carry signal which is one of carry signals of next stages, a first electrode configured to receive the previous carry signal and a second electrode connected to the pull up control node.

In an embodiment, the gate driving circuit may further include a third pull up control circuit including a control electrode connected to the pull down control node, a first electrode configured to receive the second low power voltage and a second electrode connected to the pull up control node.

In an embodiment, the gate output circuit may include a first-first switching element including a control electrode connected to the pull up control node, a first electrode configured to receive a first gate clock signal and a second electrode connected to a first gate output node, a first-second switching element including a control electrode connected to the pull down control node, a first electrode configured to receive a first low power voltage and a second electrode connected to the first gate output node, a second-first switching element including a control electrode connected to the pull up control node, a first electrode configured to receive a second gate clock signal having a timing different from a timing of the first gate clock signal and a second electrode connected to a second gate output node and a second-second switching element including a control electrode connected to the pull down control node, a first electrode configured to receive the first low power voltage and a second electrode connected to the second gate output node.

In an embodiment, the gate output circuit may further include a third-first switching element including a control electrode connected to the pull up control node, a first electrode configured to receive a third gate clock signal having a timing different from the timings of the first gate clock signal and the second gate clock signal and a second electrode connected to a third gate output node, a third-second switching element including a control electrode connected to the pull down control node, a first electrode configured to receive the first low power voltage and a second electrode connected to the third gate output node, a fourth-first switching element including a control electrode connected to the pull up control node, a first electrode configured to receive a fourth gate clock signal having a timing different from the timings of the first gate clock signal, the second gate clock signal and the third gate clock signal and a second electrode connected to a fourth gate output node and a fourth-second switching element including a control electrode connected to the pull down control node, a first electrode for receiving the first low power voltage and a second electrode connected to the fourth gate output node.

In an embodiment, the gate driving circuit may further include a line selecting circuit configured to select a gate line of a stage which has a carry signal having an active level as a sensing gate line based on a first control signal.

In an embodiment, the line selecting circuit may include a first sensing switching element including a control electrode configured to receive the first control signal, a first electrode configured to receive the carry signal and a second electrode connected to a certain node, a second sensing switching element including a control electrode configured to receive a second control signal, a first electrode connected to a second electrode of a third sensing switching element and a second electrode connected to the pull up control node, the third sensing switching element including a control electrode connected to the certain node, a first electrode configured to receive the first high power voltage and the second electrode connected to the first electrode of the second sensing switching element and a certain capacitor including a first end configured to receive the first high power voltage and a second end connected to the certain node.

In an embodiment of a gate driving circuit according to the present invention, the gate driving circuit includes: a first pull up control circuit configured to control a voltage of a first pull up control node in response to a previous carry signal which is one of carry signals of previous stages: a pull down control circuit configured to control a voltage of a pull down control node in response to the voltage of the first pull up control node: a boosting circuit including a boosting capacitor and configured to boost a voltage of a second pull up control node: a gate output circuit configured to output a plurality of gate signals having different timings in response to the voltage of the second pull up control node and the voltage of the pull down control node: a stabilizing circuit including a control electrode connected to an end of the boosting capacitor, a first electrode configured to receive a first high power voltage and a second electrode connected to the first pull up control circuit; and a node separating circuit disposed between the first pull up control circuit and the boosting circuit, and including a control electrode configured to receive the first high power voltage, a first electrode connected to the first pull up control node and a second electrode connected to the second pull up control node.

In an embodiment of a display apparatus according to the present invention, the display apparatus includes a display panel, a gate driver and a data driver. The gate driver is configured to output a gate signal to the display panel. The data driver is configured to output a data voltage to the display panel. A gate driving circuit of the gate driver may include a first pull up control circuit configured to control a voltage of a pull up control node in response to a previous carry signal which is one of carry signals of previous stages, a pull down control circuit configured to control a voltage of a pull down control node in response to the voltage of the pull up control node, a boosting circuit including a boosting capacitor and configured to boost the voltage of the pull up control node, a gate output circuit configured to output a plurality of gate signals having different timings in response to the voltage of the pull up control node and the voltage of the pull down control node and a stabilizing circuit including a control electrode connected to an end of the boosting capacitor, a first electrode configured to receive a first high power voltage and a second electrode connected to the first pull up control circuit.

In an embodiment, the first pull up control circuit may include a fourth switching element including a control electrode configured to receive the previous carry signal, a first electrode configured to receive the previous carry signal and a second electrode connected to the pull up control node. The fourth switching element may include two transistors connected to each other in series. The second electrode of the stabilizing circuit may be connected to an intermediate node of the two transistors of the fourth switching element which are connected to each other in series.

According to the gate driving circuit and the display apparatus including the gate driving circuit, the control electrode of the tenth switching element of the stabilizing circuit may be connected to the first end of the booting capacitor of the boosting circuit so that the gate-source voltage of the tenth switching element may be decreased.

When the gate-source voltage of the tenth switching element is decreased, the damage of the tenth switching element due to the deterioration of the tenth switching element may be prevented. When the damage of the tenth switching element is prevented, the reliability of the gate driving circuit and the display apparatus may be effectively enhanced.

BRIEF DESCRIPTION OF THE DRAWINGS

The above and other features and advantages of the present invention will become more apparent by describing in detailed embodiments thereof with reference to the accompanying drawings, in which.

DETAILED DESCRIPTION

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, the present invention will be explained in detail with reference to the accompanying drawings.

Figure 1:
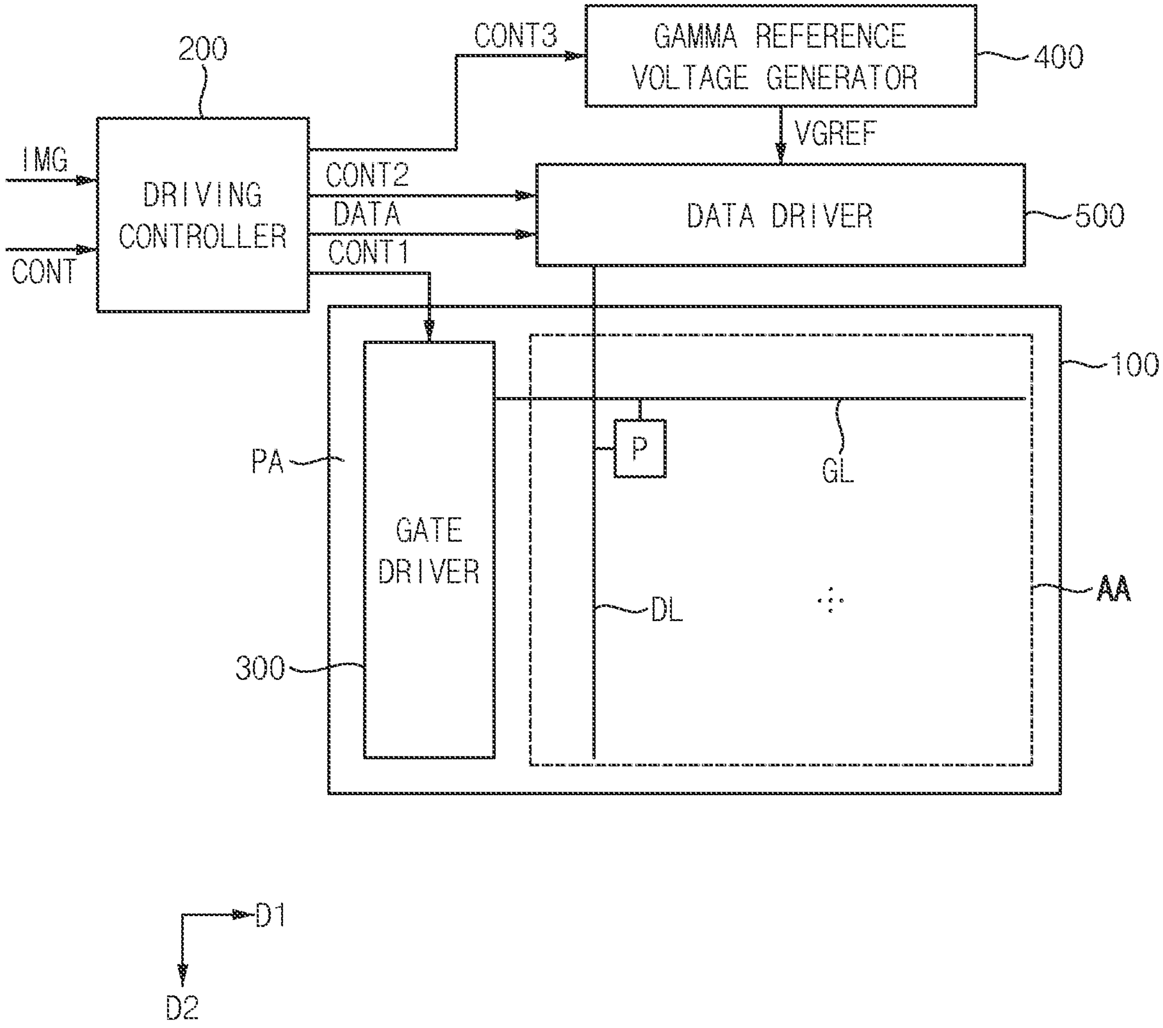
FIG. 1 is a block diagram illustrating a display apparatus according to an embodiment of the present invention.

FIG. 1 is a block diagram illustrating a display apparatus according to an embodiment of the present invention.

Referring to FIG. 1, the display apparatus includes a display panel 100 and a display panel driver. The display panel driver includes a driving controller 200, a gate driver 300, a gamma reference voltage generator 400 and a data driver 500.

In an embodiment, for example, the driving controller 200 and the data driver 500 may be integrally formed. For example, the driving controller 200, the gamma reference voltage generator 400 and the data driver 500 may be integrally formed. A driving module including at least the driving controller 200 and the data driver 500 which are integrally formed may be called to a timing controller embedded data driver ("TED").

The display panel 100 has a display region AA on which an image is displayed and a peripheral region PA adjacent to the display region AA.

The display panel 100 includes a plurality of gate lines GL, a plurality of data lines DL and a plurality of pixels connected to the gate lines GL and the data lines DL. The gate lines GL may extend in a first direction D1 and the data lines DL may extend in a second direction D2 crossing the first direction D1.

The driving controller 200 receives input image data IMG and an input control signal CONT from an external apparatus. The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a gate control signal CONT1, a data control signal CONT2, a gamma control signal CONT3 and a data signal DATA based on the input image data IMG and the input control signal CONT.

The driving controller 200 generates the gate control signal CONT1 for controlling an operation of the gate driver 300 based on the input control signal CONT, and outputs the gate control signal CONT1 to the gate driver 300. The gate control signal CONT1 may include a vertical start signal and a gate clock signal.

The driving controller 200 generates the data control signal CONT2 for controlling an operation of the data driver 500 based on the input control signal CONT, and outputs the data control signal CONT2 to the data driver 500. The data control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the gamma control signal CONT3 for controlling an operation of the gamma reference voltage generator 400 based on the input control signal CONT, and outputs the gamma control signal CONT3 to the gamma reference voltage generator 400.

The gate driver 300 generates gate signals driving the gate lines GL in response to the gate control signal CONT1 received from the driving controller 200. The gate driver 300 outputs the gate signals to the gate lines GL. For example, the gate driver 300 may sequentially output the gate signals to the gate lines GL. For example, the gate driver 300 may be mounted on the peripheral region of the display panel 100. For example, the gate driver 300 may be integrated on the peripheral region of the display panel 100.

The gamma reference voltage generator 400 generates a gamma reference voltage VGREF in response to the gamma control signal CONT3 received from the driving controller 200. The gamma reference voltage generator 400 provides the gamma reference voltage VGREF to the data driver 500.

In an embodiment, the gamma reference voltage generator 400 may be disposed in the driving controller 200, or in the data driver 500.

The data driver 500 receives the data control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

Figure 2:
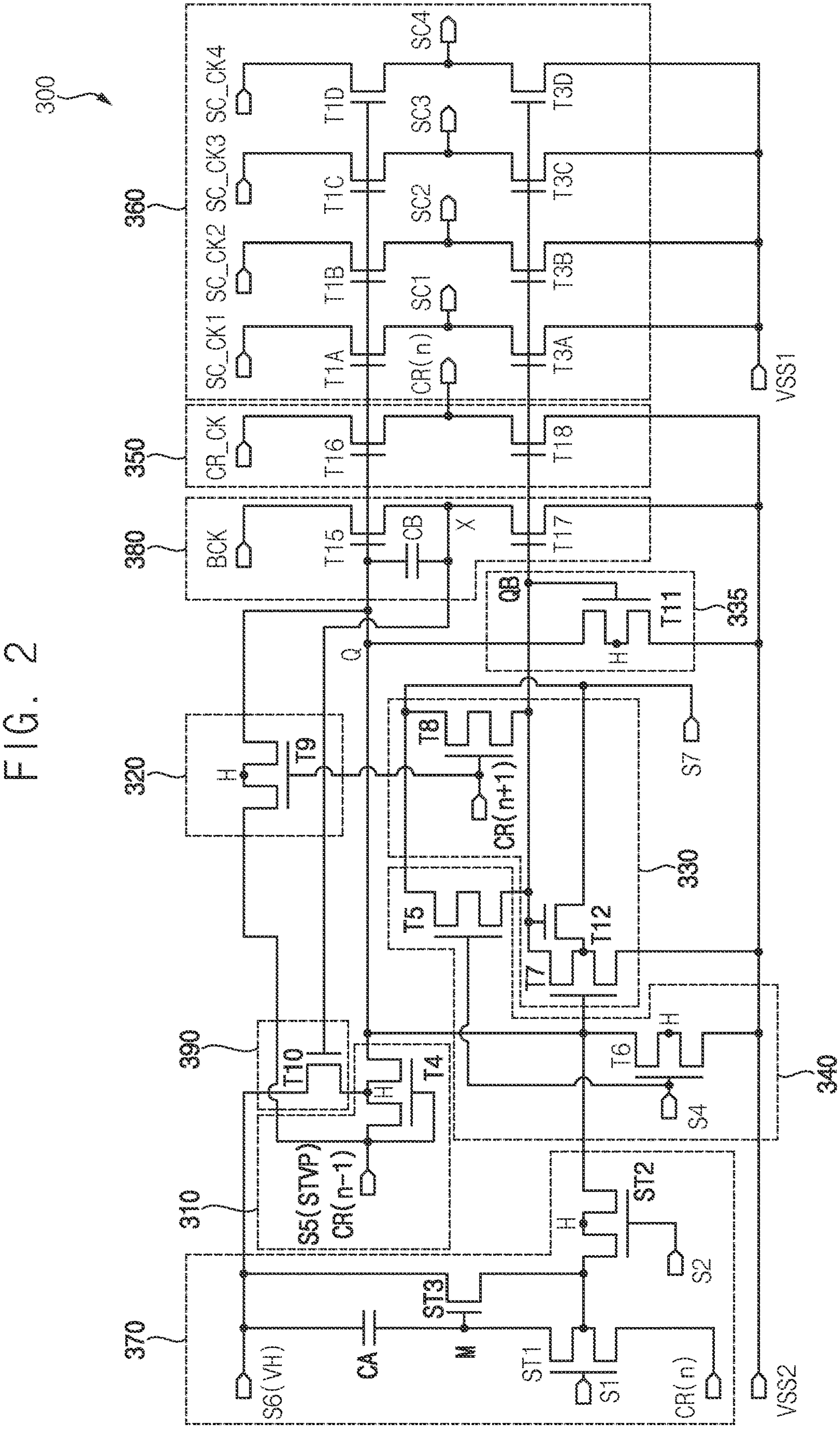
FIG. 2 is a circuit diagram illustrating a gate driving circuit of a gate driver of FIG. 1.
Figure 3:
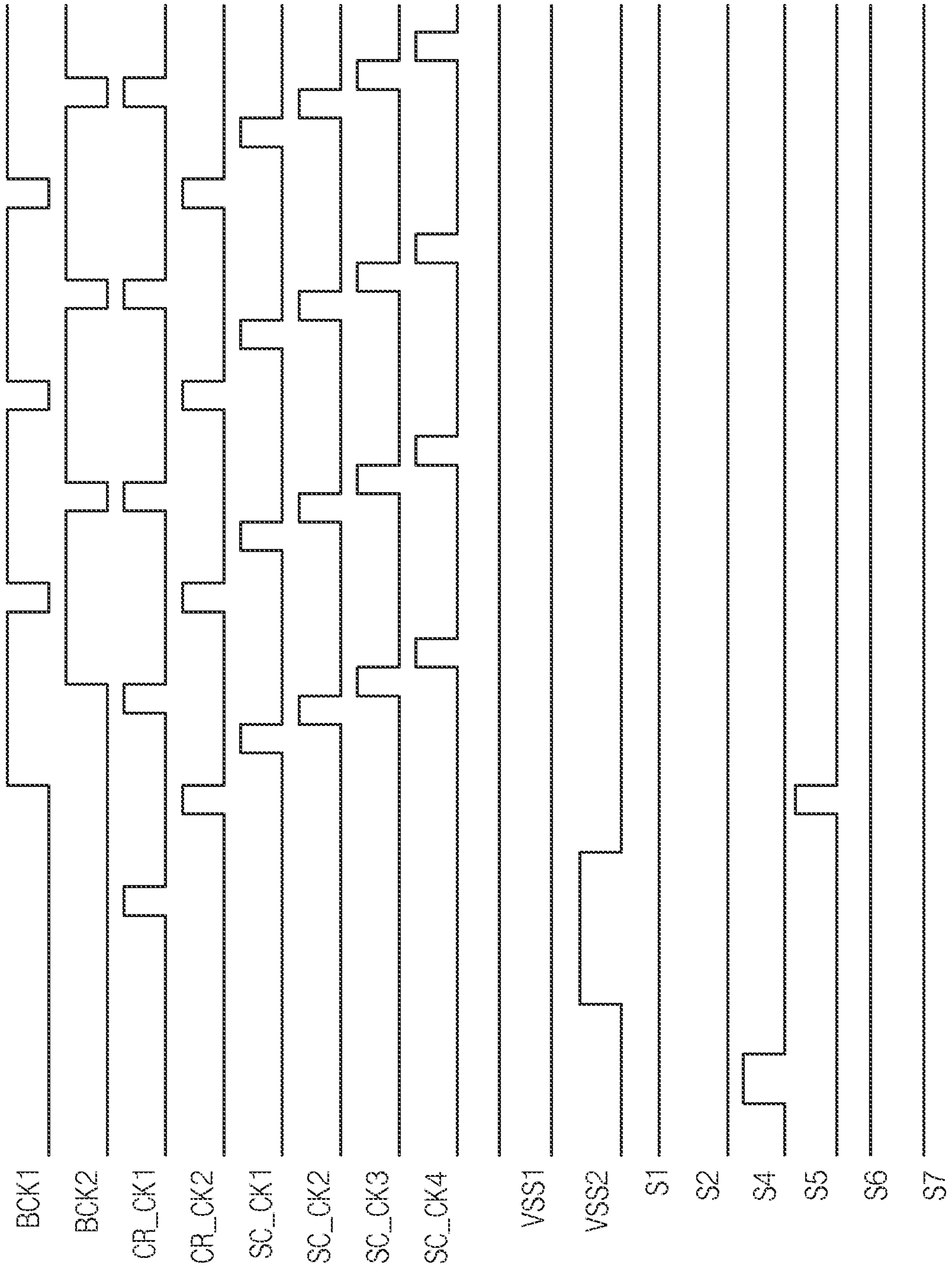
FIG. 3 is a timing diagram illustrating input signals of the gate driving circuit of FIG. 2.
Figure 4:
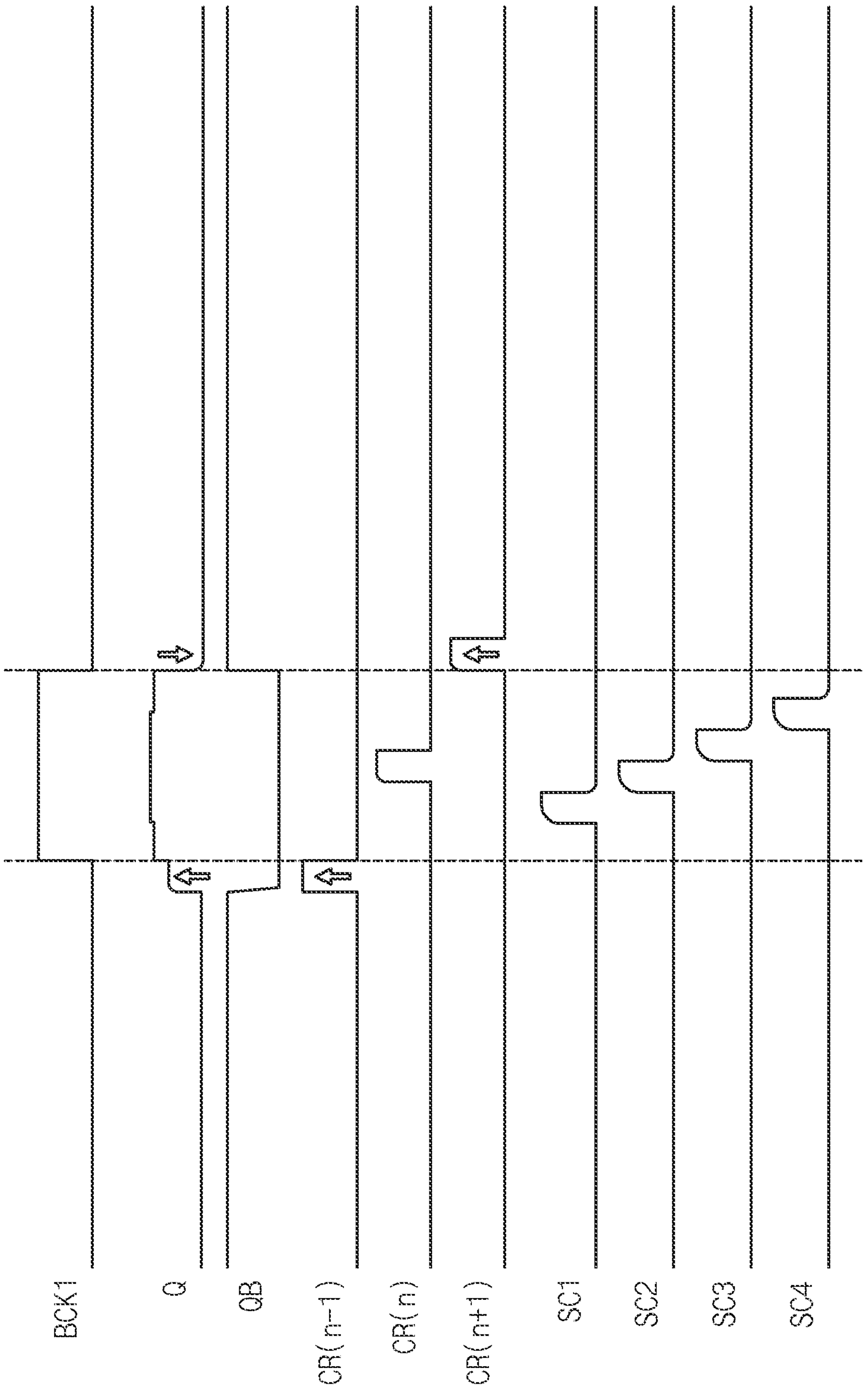
FIG. 4 is a timing diagram illustrating input signals, node signals and output signals of the gate driving circuit of FIG. 2.

FIG. 2 is a circuit diagram illustrating a gate driving circuit of the gate driver 300 of FIG. 1. FIG. 3 is a timing diagram illustrating input signals of the gate driving circuit of FIG. 2. FIG. 4 is a timing diagram illustrating input signals, node signals and output signals of the gate driving circuit of FIG. 2.

Referring to FIGS. 1 to 4, the gate driving circuit includes a first pull up control circuit 310, a pull down control circuit 330, a boosting circuit 380, a gate output circuit 360 and a stabilizing circuit 390.

The first pull up control circuit 310 may control a voltage of a pull up control node Q in response to a previous carry signal CR(n−1) which is one of carry signals of previous stages.

In an embodiment, for example, the first pull up control circuit 310 may include a fourth switching element T4 including a control electrode for receiving the previous carry signal CR(n−1), a first electrode for receiving the previous carry signal CR(n−1) and a second electrode connected to the pull up control node Q.

In the present embodiment, the previous carry signal CR(n−1) may be a carry signal of an immediately previous stage n−1 of a present stage n. The previous stage does not exist for an uppermost stage so that a vertical start signal S5(STVP) may be applied to the uppermost stage instead of the previous carry signal CR(n−1).

When the previous carry signal CR(n−1) has an active level, the fourth switching element T4 is turned on so that the previous carry signal CR(n−1) may be applied to the pull up control node Q.

In an embodiment, for example, the fourth switching element T4 may include two transistors connected to each other in series.

The boosting circuit 380 may include a boosting capacitor CB. The boosting circuit 380 may boost a voltage of the pull up control node Q.

The boosting circuit 380 may further include a fifteenth switching element T15 including a control electrode connected to the pull up control node Q, a first electrode for receiving a boosting clock signal BCK: BCK1/BCK2 and a second electrode connected to a first node X and a seventeenth switching element T17 including a control electrode connected to a pull down control node QB, a first electrode for receiving a second low power voltage VSS2 and a second electrode connected to the first node X. The boosting capacitor CB may include a first end connected to the first node X and a second end connected to the pull up control node Q.

When a voltage of the pull up control node Q has an active level, the fifteenth switching element T15 is turned on so that the boosting clock signal BCK: BCK1/2 may be outputted to the first node X.

When a voltage of the pull down control node QB has an active level, the seventeenth switching element T17 is turned on so that the first node X may be pulled down to the second low voltage VSS2.

The stabilizing circuit 390 may include a control electrode connected to an end of the boosting capacitor CB, a first electrode for receiving a first high power voltage S6(VH) and a second electrode connected to the first pull up control circuit 310.

The stabilizing circuit 390 may include a tenth switching element T10 including a control electrode connected to the first node X, a first electrode for receiving the first high power voltage S6(VH) and a second electrode connected to an intermediate node H of the two transistors of the fourth switching element T4 which are connected to each other in series.

When the voltage of the first node X has an active level, the tenth switching element T10 is turned on so that the intermediate node H of the two transistors of the fourth switching element T4 may rise to the first high power voltage VH. The tenth switching element T10 may prevent the fourth switching element T4 from being damaged due to a too high drain-source voltage VDS applied to both ends of the fourth switching element T4. In addition, the tenth switching element T10 may prevent a current leakage through the fourth switching element T4.

The pull down control circuit 330 may control the voltage of the pull down control node QB in response to the voltage of the pull up control node Q.

In an embodiment, for example, the pull down control circuit 330 may include a seventh switching element T7 including a control electrode connected to the pull up control node Q, a first electrode for receiving a second low power voltage VSS2 and a second electrode connected to the pull down control node QB and an eight switching element T8 including a control electrode for receiving a next carry signal CR(n+1) which is one of carry signals of next stages, a first electrode for receiving a second high power voltage S7 and a second electrode connected to the pull down control node QB.

In the present embodiment, the next carry signal CR(n+1) may be a carry signal of an immediately next stage n+1 of the present stage n.

In an embodiment, for example, a level of the second high power voltage S7 may be less than a level of the first high power voltage VH.

When the pull up control node Q has an active level, the seventh switching element T7 is turned on so that the pull down control node QB may fall to an inactive level (e.g. VSS2).

In addition, when the next carry signal CR(n+1) has an active level, the eighth switching element T8 is turned on so that the pull down control node QB may rise to an active level (e.g. S7).

The seventh switching element T7 may include two transistors connected to each other in series. The pull down control circuit 330 may further include a twelfth switching element T12 including a control electrode connected to the pull down control node QB, a first electrode for receiving the second high power voltage S7 and a second electrode connected to an intermediate node of the two transistors of the seventh switching element T7 which are connected to each other in series.

When the pull down control node QB has an active level, the twelfth switching element T12 is turned on so that the intermediate node of the two transistors of the seventh switching element T7 may rise to the second high power voltage S7. The twelfth switching element T12 may prevent the seventh switching element T7 from being damaged due to a too high drain-source voltage VDS applied to both ends of the seventh switching element T7. In addition, the twelfth switching element T12 may prevent a current leakage through the seventh switching element T7.

In an embodiment, for example, the eighth switching element T8 may include two transistors connected to each other in series.

The gate driving circuit may further include a reset circuit 340 initializing the pull up control node Q and the pull down control node QB in response to a fourth control signal S4.

The reset circuit 340 may include a fifth switching element T5 including a control electrode for receiving the fourth control signal S4, a first electrode for receiving the second high power voltage S7 and a second electrode connected to the pull down control node QB and a sixth switching element T6 including a control electrode for receiving the fourth control signal S4, a first electrode for receiving the second low power voltage VSS2 and a second electrode connected to the pull up control node Q.

The fourth control signal S4 is a signal for resetting the pull up control node Q and the pull down control node QB of all stages of the gate driving circuit. For example, when the display apparatus operates abnormally, an activation pulse may be applied to the fourth control signal S4 to reset the pull up control node Q and the pull down control node QB of all stages of the gate driving circuit. In addition, in an initial period when the display apparatus is turned on, the activation pulse may be applied to the fourth control signal S4 to reset the pull up control node Q and the pull down control node QB of all stages of the gate driving circuit. In addition, in a predetermined cycle during an operation of the display apparatus, the activation pulse may be applied to the fourth control signal S4 to reset the pull up control node Q and the pull down control node QB of all stages of the gate driving circuit.

In an embodiment, for example, the fifth switching element T5 may include two transistors connected to each other in series.

In an embodiment, for example, the sixth switching element T6 may include two transistors connected to each other in series. The second electrode of the tenth switching element T10 of the stabilizing circuit 390 may be connected to an intermediate node H of the two transistors of the sixth switching element T6.

When the voltage of the first node X has the active level, the tenth switching element T10 is turned on so that the intermediate node H of the two transistors of the sixth switching element T6 may rise to the first high power voltage VH. The tenth switching element T10 may prevent the sixth switching element T6 from being damaged due to a too high drain-source voltage VDS applied to both ends of the sixth switching element T6. In addition, the tenth switching element T10 may prevent a current leakage through the sixth switching element T6.

The gate driving circuit may further include a carry output circuit 350 for outputting a carry signal CR(n) in response to the voltage of the pull up control node Q and the voltage of the pull down control node QB.

The carry output circuit 350 may include a sixteenth switching element T16 including a control electrode connected to the pull up control node Q, a first electrode for receiving a carry clock signal CR_CK: CR_CK1/2 and a second electrode connected to a carry output node and an eighteenth switching element T18 including a control electrode connected to the pull down control node QB, a first electrode for receiving the second low power voltage VSS2 and a second electrode connected to the carry output node.

When the voltage of the pull up control node Q has the active level, the sixteenth switching element T16 is turned on so that the carry clock signal CR_CK: CR_CK1/2 may be outputted as the carry signal CR(n).

When the voltage of the pull down control node QB has the active level, the eighteenth switching element T18 is turned on so that the carry signal CR(n) may be pulled down to the second low power voltage VSS2.

The gate output circuit 360 may output a plurality of gate signals SC1, SC2, SC3 and SC4 having different timings in response to the voltage of the pull up control node Q and the voltage of the pull down control node QB.

In the present embodiment, for example, the gate output circuit 360 includes four output buffers and outputs four gate signals SC1, SC2, SC3 and SC4. However, the present invention may not be limited to the number of the gate signals outputted from one gate output circuit 360.

In an embodiment, for example, the gate output circuit 360 may include a 1A switching element T1A (referred to as "first-first switching element") including a control electrode connected to the pull up control node Q, a first electrode for receiving a first gate clock signal SC_CK1 and a second electrode connected to a first gate output node, a 3A switching element T3A (referred to as "first-second switching element") including a control electrode connected to the pull down control node QB, a first electrode for receiving a first low power voltage VSS1 and a second electrode connected to the first gate output node, a 1B switching element T1B (referred to as "second-first switching element") including a control electrode connected to the pull up control node Q, a first electrode for receiving a second gate clock signal SC_CK2 having a timing different from a timing of the first gate clock signal SC_CK1 and a second electrode connected to a second gate output node and a 3B switching element T3B (referred to as "second-second switching element") including a control electrode connected to the pull down control node QB, a first electrode for receiving the first low power voltage VSS1 and a second electrode connected to the second gate output node.

In an embodiment, for example, the gate output circuit 360 may further include a 1C switching element TIC (referred to as "third-first switching element") including a control electrode connected to the pull up control node Q, a first electrode for receiving a third gate clock signal SC_CK3 having a timing different from the timings of the first gate clock signal SC_CK1 and the second gate clock signal SC_CK2 and a second electrode connected to a third gate output node, a 3C switching element T3C (referred to as "third-second switching element") including a control electrode connected to the pull down control node QB, a first electrode for receiving the first low power voltage VSS1 and a second electrode connected to the third gate output node, a 1D switching element T1D (referred to as "fourth-first switching element") including a control electrode connected to the pull up control node Q, a first electrode for receiving a fourth gate clock signal SC_CK4 having a timing different from the timings of the first gate clock signal SC_CK1, the second gate clock signal SC_CK2 and the third gate clock signal SC_CK3 and a second electrode connected to a fourth gate output node and a 3D switching element T3D (referred to as "fourth-second switching element") including a control electrode connected to the pull down control node QB, a first electrode for receiving the first low power voltage VSS1 and a second electrode connected to the fourth gate output node.

When the voltage of the pull up control node Q has the active level, the 1A switching element T1A is turned on so that the first gate clock signal SC_CK1 is outputted as the first gate signal SC1.

When the voltage of the pull down control node QB has the active level, the 3A switching element T3A is turned on so that the first gate signal SC1 may be pulled down to the first low power voltage VSS1.

When the voltage of the pull up control node Q has the active level, the 1B switching element T1B is turned on so that the second gate clock signal SC_CK2 is outputted as the second gate signal SC2.

When the voltage of the pull down control node QB has the active level, the 3B switching element T3B is turned on so that the second gate signal SC2 may be pulled down to the first low power voltage VSS1.

When the voltage of the pull up control node Q has the active level, the 1C switching element T1C is turned on so that the third gate clock signal SC_CK3 is outputted as the third gate signal SC3.

When the voltage of the pull down control node QB has the active level, the 3C switching element T3C is turned on so that the third gate signal SC3 may be pulled down to the first low power voltage VSS1.

When the voltage of the pull up control node Q has the active level, the 1D switching element T1D is turned on so that the fourth gate clock signal SC_CK4 is outputted as the fourth gate signal SC4.

When the voltage of the pull down control node QB has the active level, the 3D switching element T3D is turned on so that the fourth gate signal SC4 may be pulled down to the first low power voltage VSS1.

As shown in FIG. 3, the first to fourth gate clock signals SC_CK1, SC_CK2, SC_CK3 and SC_CK4 may have different timings and the first to fourth gate signals SC1, SC2, SC3 and SC4 may have different timings.

In an embodiment, for example, the first to fourth gate signals SC1, SC2, SC3 and SC4 may be sequentially applied to adjacent four gate lines. A first stage of the gate driving circuit may output the first to fourth gate signals SC1, SC2, SC3 and SC4 to first to fourth gate lines. A second stage of the gate driving circuit may output fifth to eighth gate signals to fifth to eighth gate lines.

In the present embodiment, the gate output circuit 360 of the gate driving circuit may output four gate signals and herein, the gate clock signals may have eight different phases. In FIG. 3, the first to fourth gate clock signals SC_CK1, SC_CK2, SC_CK3 and SC_CK4 for outputting the first to fourth gate signals SC1, SC2, SC3 and SC4 are shown and the fifth to eighth gate clock signals for outputting the fifth to eighth gate signals are omitted.

A length of an active period of the boosting clock signal BCK: BCK1/BCK2 applied to the boosting circuit 380 may be greater than a length of an active period of the first gate clock signal SC_CK1 applied to the gate output circuit 360. Similarly, the length of the active period of the boosting clock signal BCK: BCK1/BCK2 applied to the boosting circuit 380 may be greater than a length of an active period of the second gate clock signal SC_CK2 applied to the gate output circuit 360, a length of an active period of the third gate clock signal SC_CK3 applied to the gate output circuit 360 and a length of an active period of the fourth gate clock signal SC_CK4 applied to the gate output circuit 360.

As shown in FIG. 4, in the present embodiment, the first to fourth gate signals SC1, SC2, SC3 and SC4 share one pull up control node Q so that the pull up control node Q may maintain a high level when the respective active pulses of the first to fourth gate signals SC1, SC2, SC3 and SC4 are outputted. In addition, when the respective active pulses of the first to fourth gate signals SC1, SC2, SC3 and SC4 are outputted, the boosting clock signal BCK1 for boosting the pull up control node Q may maintain a high level.

In an embodiment, for example, a timing of a rising edge of the boosting clock signal BCK1 may be substantially the same as a timing of a falling edge of the previous carry signal CR(n−1). For example, a timing of a falling edge of the boosting clock signal BCK1 may be substantially the same as a timing of a rising edge of the next carry signal CR(n+1).

The gate driving circuit may further include a second pull up control circuit 320 including a control electrode for receiving the next carry signal CR(n+1), a first electrode for receiving the previous carry signal CR(n−1) and a second electrode connected to the pull up control node Q.

The second pull up control circuit 320 pulls down a level of the pull up control node Q in response to the next carry signal CR(n+1).

In an embodiment, for example, the second pull up control circuit 320 may include a ninth switching element T9 including a control electrode for receiving the next carry signal CR(n+1), a first electrode for receiving the previous carry signal CR(n−1) and a second electrode connected to the pull up control node Q.

Although the first electrode of the ninth switching element T9 receives the previous carry signal CR(n−1) in the present embodiment, the present invention may not be limited thereto. Alternatively, the first electrode of the ninth switching element T9 may receive the second low power voltage VSS2.

In an embodiment, for example, the ninth switching element T9 may include two transistors connected to each other in series. The second electrode of the tenth switching element T10 of the stabilizing circuit 390 may be connected to an intermediate node H of the two transistors of the ninth switching element T9.

When the voltage of the first node X has the active level, the tenth switching element T10 is turned on so that the intermediate node H of the two transistors of the ninth switching element T9 may rise to the first high power voltage VH. The tenth switching element T10 may prevent the ninth switching element T9 from being damaged due to a too high drain-source voltage VDS applied to both ends of the ninth switching element T9. In addition, the tenth switching element T10 may prevent a current leakage through the ninth switching element T9.

The gate driving circuit may further include a third pull up control circuit 335 including a control electrode connected to the pull down control node QB, a first electrode for receiving the second low power voltage VSS2 and a second electrode connected to the pull up control node Q.

The third pull up control circuit 335 pulls down the level of the pull up control node Q in response to the voltage of the pull down control node QB.

In an embodiment, for example, the third pull up control circuit 335 may include an eleventh switching element T11 including a control electrode connected to the pull down control node QB, a first electrode for receiving the second low power voltage VSS2 and a second electrode connected to the pull up control node Q.

In an embodiment, for example, the eleventh switching element T11 may include two transistors connected to each other in series. The second electrode of the tenth switching element T10 of the stabilizing circuit 390 may be connected to an intermediate node H of the two transistors of the eleventh switching element T11.

When the voltage of the first node X has the active level, the tenth switching element T10 is turned on so that the intermediate node H of the two transistors of the eleventh switching element T11 may rise to the first high power voltage VH. The tenth switching element T10 may prevent the eleventh switching element T11 from being damaged due to a too high drain-source voltage VDS applied to both ends of the eleventh switching element T11. In addition, the tenth switching element T10 may prevent a current leakage through the eleventh switching element T11.

The gate driving circuit may further include a line selecting circuit 370 for selecting a gate line of the stage which has the carry signal CR(n) having the active level as a sensing gate line based on a first control signal S1.

The line selecting circuit 370 may include a first sensing switching element ST1 including a control electrode for receiving the first control signal S1, a first electrode for receiving the carry signal CR(n) and a second electrode connected to a certain node M, a second sensing switching element ST2 including a control electrode for receiving a second control signal S2, a first electrode connected to a second electrode of a third sensing switching element ST3 and a second electrode connected to the pull up control node Q, the third sensing switching element ST3 including a control electrode connected to the certain node M, a first electrode for receiving the first high power voltage VH and the second electrode connected to the first electrode of the second sensing switching element ST2 and a certain capacitor CA including a first end for receiving the first high power voltage VH and a second end connected to the certain node M.

In an embodiment, for example, the second sensing switching element ST2 may include two transistors connected to each other in series. The second electrode of the tenth switching element T10 of the stabilizing circuit 390 may be connected to an intermediate node H of the two transistors of the second sensing switching element ST2 which are connected to each other in series.

When the voltage of the first node X has the active level, the tenth switching element T10 is turned on so that the intermediate node H of the two transistors of the second sensing switching element ST2 may rise to the first high power voltage VH. The tenth switching element T10 may prevent the second sensing switching element ST2 from being damaged due to a too high drain-source voltage VDS applied to both ends of the second sensing switching element ST2. In addition, the tenth switching element T10 may prevent a current leakage of the second sensing switching element ST2.

When the first control signal S1 has the active pulse, the first sensing switching element ST1 is turned on and the gate line of the stage which has the carry signal CR(n) having the active level is selected as the sensing gate line.

The stage including the selected sensing gate line may be activated by the second control signal S2 in a blank period so that the selected stage may output the sensing gate signal.

Figure 5:
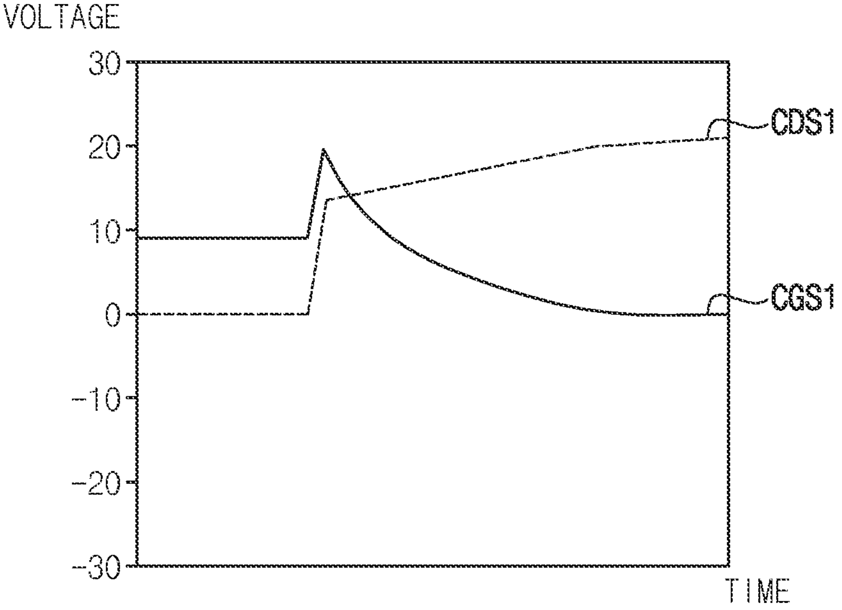
FIG. 5 is a graph illustrating a gate-source voltage and a drain-source voltage of a tenth switching element according to a comparative embodiment.
Figure 6:
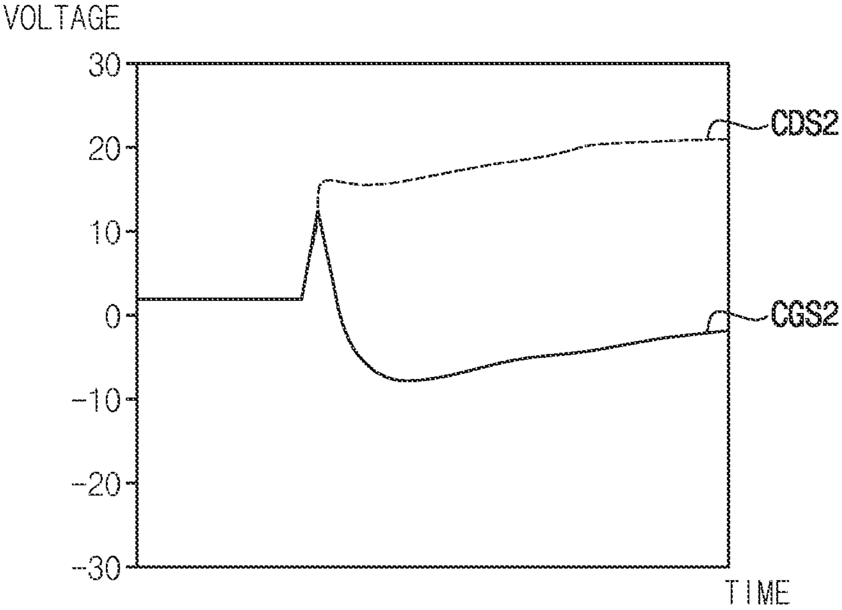
FIG. 6 is a graph illustrating a gate-source voltage and a drain-source voltage of a tenth switching element according to the present embodiment.
Figure 7:
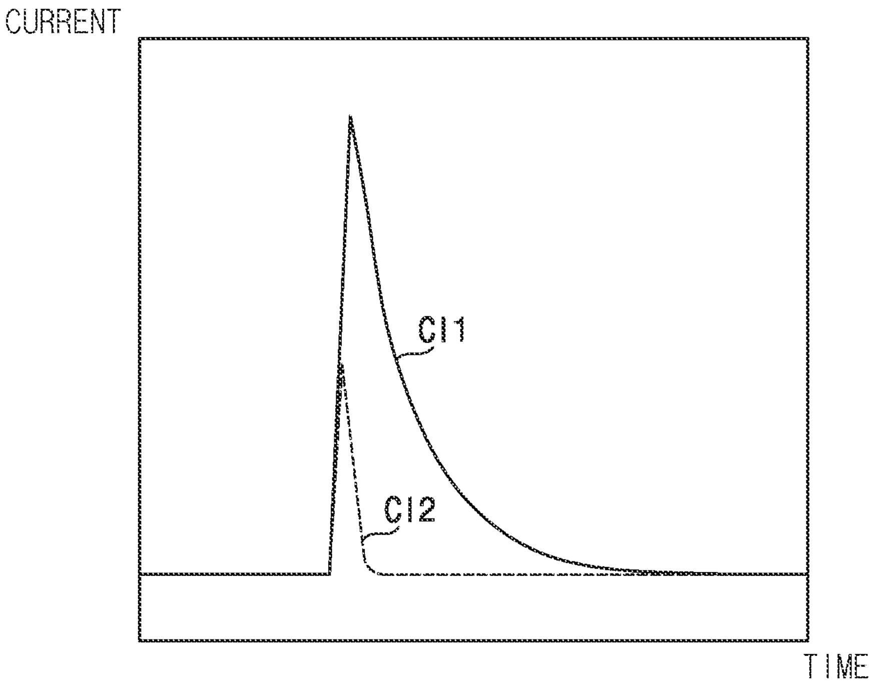
FIG. 7 is a graph illustrating a current of the tenth switching element according to the comparative embodiment and the present embodiment.

FIG. 5 is a graph illustrating a gate-source voltage and a drain-source voltage of a tenth switching element according to a comparative embodiment. FIG. 6 is a graph illustrating a gate-source voltage and a drain-source voltage of a tenth switching element according to the present embodiment. FIG. 7 is a graph illustrating a current of the tenth switching element according to the comparative embodiment and the present embodiment.

In the comparative embodiment of FIG. 5, the control electrode of the tenth switching element T10 may be connected to the pull up control node Q. In the present embodiment of FIG. 6, the control electrode of the tenth switching element T10 may be connected to the first node X.

The pull up control node Q is boosted by the boosting capacitor CB so that the voltage of the pull up control node Q may rise to about 20V. In contrast, the voltage of the first node X may rise to the high level of the boosting clock signal BCK1 of FIG. 4. The high level of the boosting clock signal BCK1 may be lower than a maximum level of the pull up control node Q. In an embodiment, for example, the high level of the boosting clock signal BCK1 may be about 12V.

In FIG. 5, the voltage of the control electrode of the tenth switching element T10 rises to about 20V or higher so that a maximum value of a curve CGS1 representing the gate-source voltage of the tenth switching element T10 may rise to about 20V. In addition, a maximum value of a curve CDS1 representing the drain-source voltage of the tenth switching element T10 may rise to about 20V.

In FIG. 6, the voltage of the control electrode of the tenth switching element T10 rises to the high level of the boosting clock signal BCK1 so that a maximum value of a curve CGS2 representing the gate-source voltage of the tenth switching element T10 may rise to about 10V. In addition, a maximum value of a curve CDS2 representing the drain-source voltage of the tenth switching element T10 may rise to about 20V.

In general, damage due to deterioration of the switching element tends to occur when the gate-source voltage and the drain-source voltage of the switching element simultaneously increase. Thus, when the gate-source voltage of the switching element is reduced, the damage due to the deterioration of the switching element may be prevented.

The maximum level of the gate-source voltage CGS2 of the tenth switching element T10 in FIG. 6 is much lower than the maximum level of the gate-source voltage CGS1 of the tenth switching element T10 in FIG. 5 so that the damage of the tenth switching element T10 may be prevented according to the present embodiment.

In addition, in FIG. 7, a current flowing through the tenth switching element T10 is represented by CI1 in the gate driving circuit according to the comparative embodiment and a current flowing through the tenth switching element T10 is represented by CI2 in the gate driving circuit according to the present embodiment.

In general, damage due to deterioration of the switching element may occur when a maximum current flowing through the switching element increases. Thus, when the maximum current flowing through the switching element is reduced, the damage due to the deterioration of the switching element may be effectively prevented.

The maximum level of the current (CI2 in FIG. 7) flowing through the tenth switching element T10 is much lower than the maximum level of the current (CI1 in FIG. 7) flowing through the tenth switching element T10 so that the damage of the tenth switching element T10 may be prevented according to the present embodiment.

According to the present embodiment, the control electrode of the tenth switching element T10 of the stabilizing circuit 390 may be connected to the first end of the booting capacitor CB of the boosting circuit 380 so that the gate-source voltage of the tenth switching element T10 may be decreased. When the gate-source voltage of the tenth switching element T10 is decreased, the damage of the tenth switching element T10 due to the deterioration of the tenth switching element T10 may be prevented. When the damage of the tenth switching element T10 is prevented, the reliability of the gate driving circuit and the display apparatus may be effectively enhanced.

Figure 8:
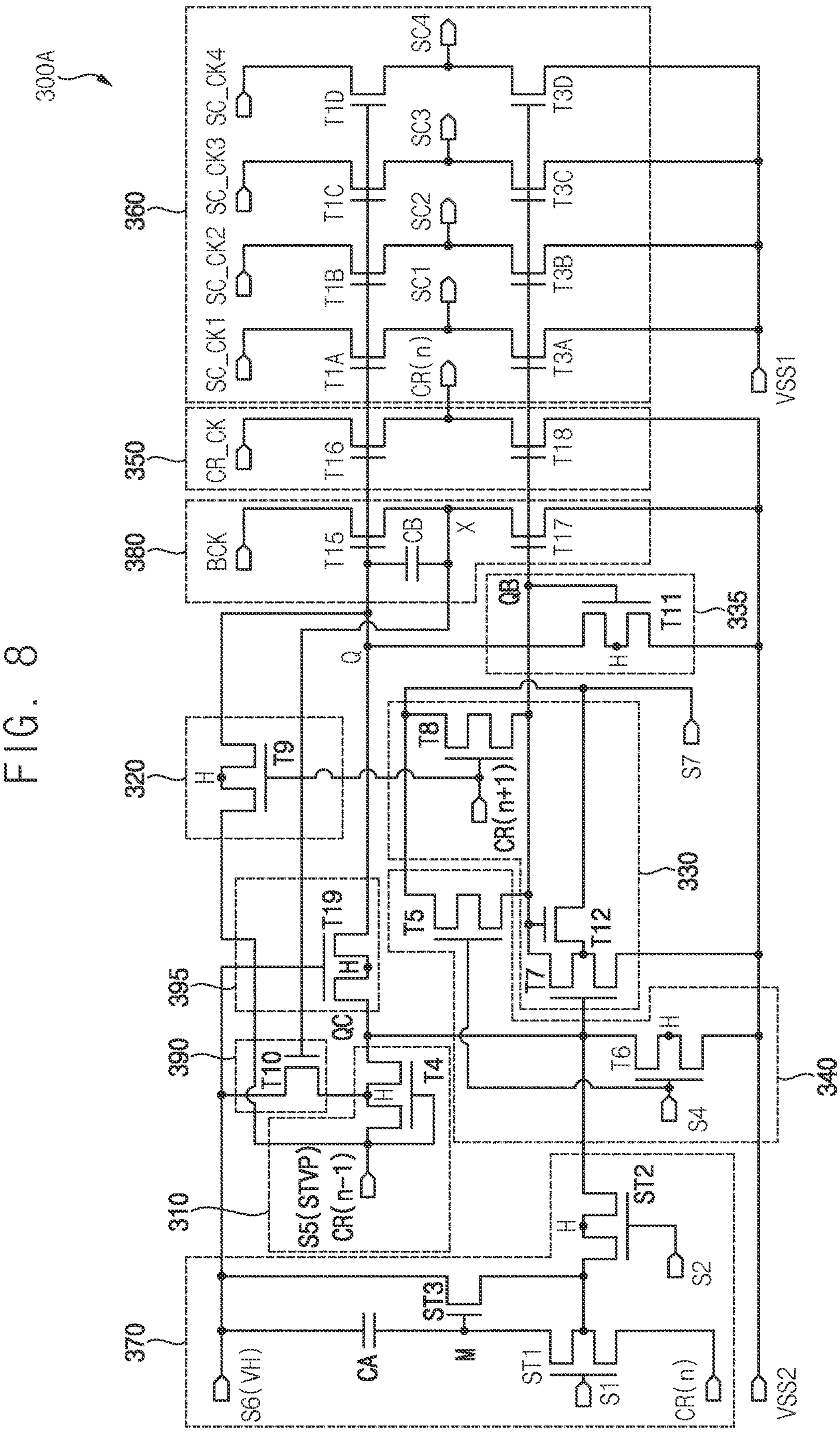
FIG. 8 is a circuit diagram illustrating a gate driving circuit of a gate driver of a display apparatus according to another embodiment of the present invention.

FIG. 8 is a circuit diagram illustrating a gate driving circuit of a gate driver 300A of a display apparatus according to another embodiment of the present invention.

The gate driver and the display apparatus according to the present embodiment is substantially the same as the gate driver and the display apparatus of the previous embodiment explained referring to FIGS. 1 to 4, 6 and 7 except that the gate driving circuit further includes a node separating circuit 395. Thus, the same reference numerals will be used to refer to the same or like parts as those described in the previous embodiment of FIGS. 1 to 4, 6 and 7 and any repetitive explanation concerning the above elements will be omitted.

Referring to FIGS. 1 and 3 to 8, the gate driving circuit includes a first pull up control circuit 310, a pull down control circuit 330, a boosting circuit 380, a gate output circuit 360 and a stabilizing circuit 390.

The first pull up control circuit 310 may control a voltage of a first pull up control node QC in response to a previous carry signal CR(n−1) which is one of carry signals of previous stages.

The boosting circuit 380 may include a boosting capacitor CB. The boosting circuit 380 may boost a voltage of a second pull up control node Q. In this embodiment, the node Q is referred to as the "second" pull up control node to be distinguished from the first pull up control node QC.

The stabilizing circuit 390 may include a control electrode connected to an end of the boosting capacitor CB, a first electrode for receiving a first high power voltage S6(VH) and a second electrode connected to the first pull up control circuit 310.

The pull down control circuit 330 may control the voltage of the pull down control node QB in response to the voltage of the first pull up control node QC.

The gate output circuit 360 may output a plurality of gate signals SC1, SC2, SC3 and SC4 having different timings in response to the voltage of the second pull up control node Q and the voltage of the pull down control node QB.

In the present embodiment, for example, the gate output circuit 360 includes four output buffers and outputs four gate signals SC1, SC2, SC3 and SC4. However, the present invention may not be limited to the number of the gate signals outputted from one gate output circuit 360.

In the present embodiment, the gate driving circuit may further include the node separating circuit 395 disposed between the first pull up control circuit 310 and the boosting circuit 380.

The node separating circuit 395 may include a nineteenth switching element T19 including a control electrode for receiving the first high power voltage VH, a first electrode connected to the first pull up control node QC and a second electrode connected to the second pull up control node Q.

In the present embodiment, the first pull up control node QC and the second pull up control node Q may be separated by the nineteenth switching element T19.

When the first gate voltage SC1, the second gate voltage SC2, the third gate voltage SC3 and the fourth gate voltage SC4 are outputted, the voltage level of the second pull up control node Q may fluctuate. When the first pull up control node QC and the second pull up control node Q are separated by the nineteenth switching element T19, the voltage of the first pull up control node QC may not fluctuate although the first gate voltage SC1, the second gate voltage SC2, the third gate voltage SC3 and the fourth gate voltage SC4 are outputted due to the nineteenth switching element T19.

In addition, when the second pull up control node Q is bootstrapped, the first pull up control node QC may not be bootstrapped by the nineteenth switching element T19. The high level of the first pull up control node QC is maintained lower than the high level of the second pull up control node Q so that VDS (the drain-source voltage) of the fourth switching element T4 may be reduced and accordingly, a damage of the fourth switching element T4 and a current leakage through the fourth switching element T4 may be effectively prevented.

According to the present embodiment, the control electrode of the tenth switching element T10 of the stabilizing circuit 390 may be connected to the first end of the booting capacitor CB of the boosting circuit 380 so that the gate-source voltage of the tenth switching element T10 may be decreased. When the gate-source voltage of the tenth switching element T10 is decreased, the damage of the tenth switching element T10 due to the deterioration of the tenth switching element T10 may be prevented. When the damage of the tenth switching element T10 is prevented, the reliability of the gate driving circuit and the display apparatus may be effectively enhanced.

Figure 9:
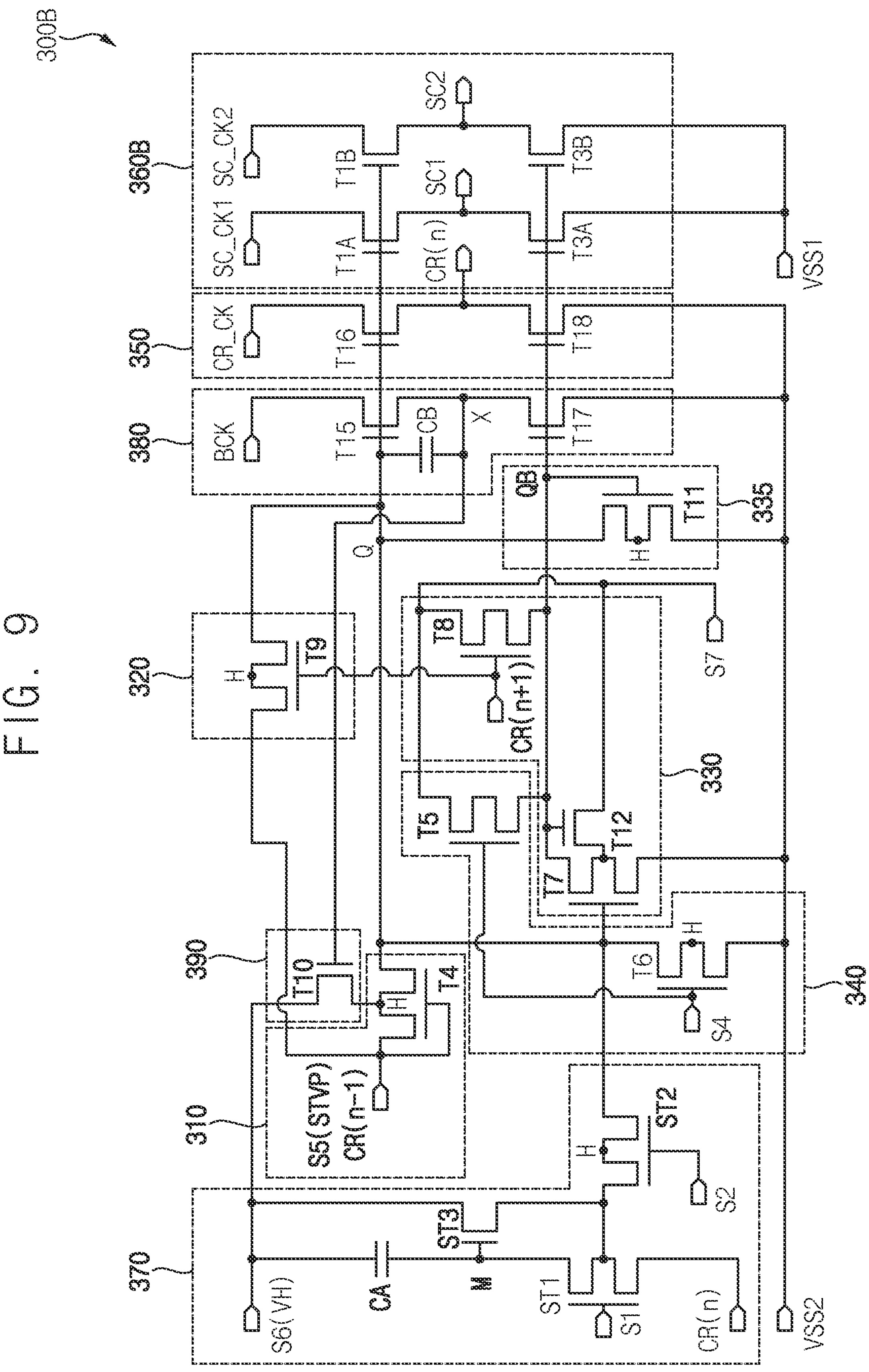
FIG. 9 is a circuit diagram illustrating a gate driving circuit of a gate driver of a display apparatus according to still another embodiment of the present invention.

FIG. 9 is a circuit diagram illustrating a gate driving circuit of a gate driver of a display apparatus according to still another embodiment of the present invention.

The gate driver and the display apparatus according to the present embodiment is substantially the same as the gate driver and the display apparatus of the previous embodiment explained referring to FIGS. 1 to 4, 6 and 7 except that the gate output circuit outputs two gate signals. Thus, the same reference numerals will be used to refer to the same or like parts as those described in the previous embodiment of FIGS. 1 to 4, 6 and 7 and any repetitive explanation concerning the above elements will be omitted.

Referring to FIGS. 1 and 3 to 9, the gate driving circuit includes a first pull up control circuit 310, a pull down control circuit 330, a boosting circuit 380, a gate output circuit 360 and a stabilizing circuit 390.

The first pull up control circuit 310 may control a voltage of a pull up control node Q in response to a previous carry signal CR(n−1) which is one of carry signals of previous stages.

The boosting circuit 380 may include a boosting capacitor CB. The boosting circuit 380 may boost a voltage of the pull up control node Q.

The stabilizing circuit 390 may include a control electrode connected to an end of the boosting capacitor CB, a first electrode for receiving a first high power voltage S6(VH) and a second electrode connected to the first pull up control circuit 310.

The pull down control circuit 330 may control the voltage of the pull down control node QB in response to the voltage of the pull up control node Q.

The gate output circuit 360B may output a plurality of gate signals SC1 and SC2 having different timings in response to the voltage of the pull up control node Q and the voltage of the pull down control node QB.

In the present embodiment, for example, the gate output circuit 360B includes two output buffers and outputs two gate signals SC1 and SC2.

In an embodiment, for example, the gate output circuit 360B may include a 1A switching element T1A including a control electrode connected to the pull up control node Q, a first electrode for receiving a first gate clock signal SC_CK1 and a second electrode connected to a first gate output node, a 3A switching element T3A including a control electrode connected to the pull down control node QB, a first electrode for receiving a first low power voltage VSS1 and a second electrode connected to the first gate output node, a 1B switching element T1B including a control electrode connected to the pull up control node Q, a first electrode for receiving a second gate clock signal SC_CK2 having a timing different from a timing of the first gate clock signal SC_CK1 and a second electrode connected to a second gate output node and a 3B switching element T3B including a control electrode connected to the pull down control node QB, a first electrode for receiving the first low power voltage VSS1 and a second electrode connected to the second gate output node.

According to the present embodiment, the control electrode of the tenth switching element T10 of the stabilizing circuit 390 may be connected to the first end of the booting capacitor CB of the boosting circuit 380 so that the gate-source voltage of the tenth switching element T10 may be decreased. When the gate-source voltage of the tenth switching element T10 is decreased, the damage of the tenth switching element T10 due to the deterioration of the tenth switching element T10 may be prevented. When the damage of the tenth switching element T10 is prevented, the reliability of the gate driving circuit and the display apparatus may be effectively enhanced.

Figure 10:
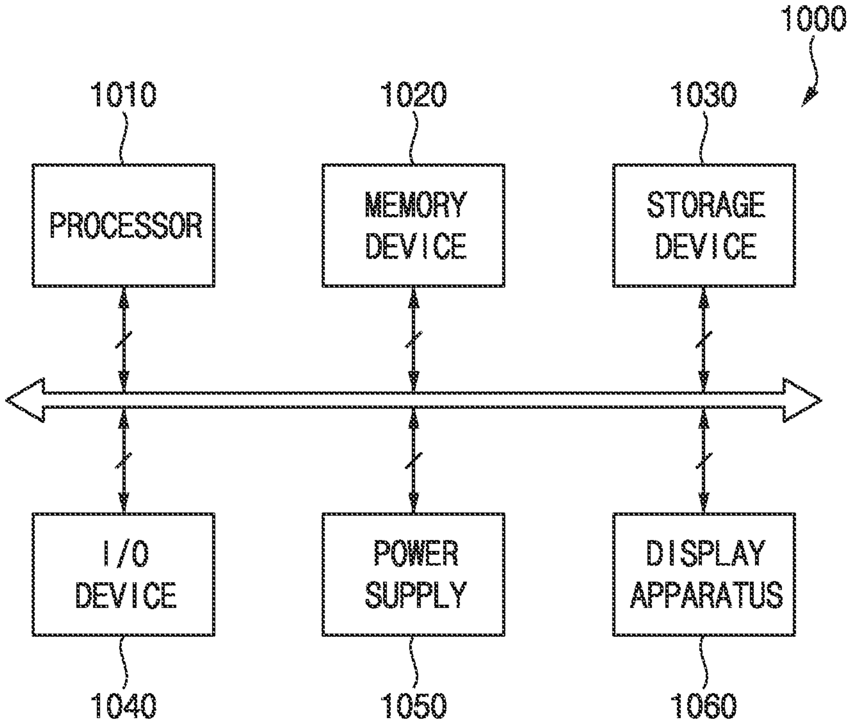
FIG. 10 is a circuit diagram illustrating a gate driving circuit of a gate driver of a display apparatus according to an embodiment of the present invention.
Figure 11:
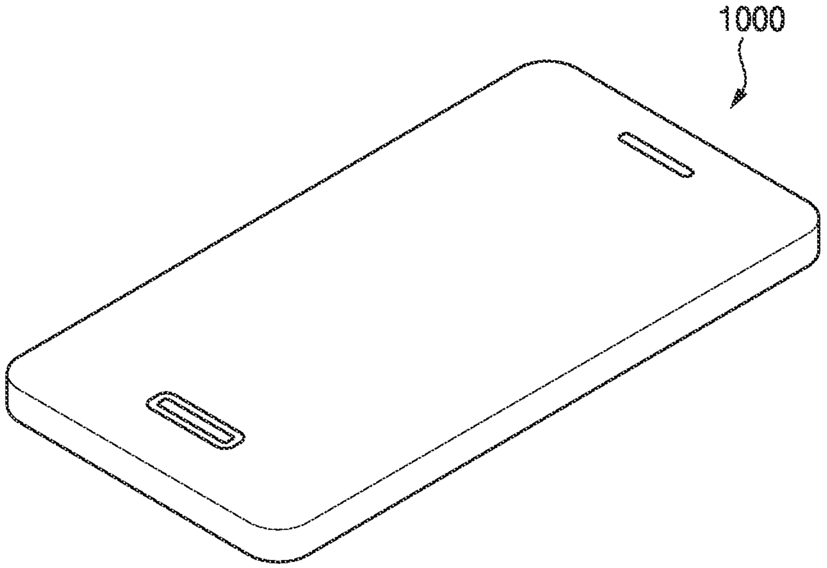
FIG. 11 is a diagram illustrating an example in which the electronic apparatus of FIG. 10 is implemented as a smart phone.

FIG. 10 is a circuit diagram illustrating a gate driving circuit of a gate driver of a display apparatus according to an embodiment of the present invention. FIG. 11 is a diagram illustrating an example in which the electronic apparatus of FIG. 10 is implemented as a smart phone.

Referring to FIGS. 10 and 11, the electronic apparatus 1000 may include a processor 1010, a memory device 1020, a storage device 1030, an input/output ("I/O") device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus ("USB") device, other electronic apparatuses, etc.

In an embodiment, as illustrated in FIG. 11, the electronic apparatus 1000 may be implemented as a smart phone. However, the electronic apparatus 1000 is not limited thereto. For another example, the electronic apparatus 1000 may be implemented as a cellular phone, a video phone, a smart pad, a smart watch, a tablet PC, a car navigation system, a computer monitor, a laptop, a head mounted display ("HMD") device, and the like.

The processor 1010 may perform various computing functions or various tasks. The processor 1010 may be a micro-processor, a central processing unit ("CPU"), an application processor ("AP"), and the like. The processor 1010 may be coupled to other components via an address bus, a control bus, a data bus, etc. Further, the processor 1010 may be coupled to an extended bus such as a peripheral component interconnection ("PCI") bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, and the like and/or at least one volatile memory device such as a dynamic random access memory ("DRAM") device, a static random access memory ("SRAM") device, a mobile DRAM device, and the like.

The storage device 1030 may include a solid state drive ("SSD") device, a hard disk drive ("HDD") device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

According to the gate driving circuit and the display apparatus in the present invention, the damage of the transistor due to the deterioration of the transistor may be prevented so that the reliability of the gate driving circuit may be effectively enhanced.

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A gate driving circuit comprising:

a first pull up control circuit configured to control a voltage of a pull up control node in response to a previous carry signal which is one of carry signals of previous stages;

a pull down control circuit configured to control a voltage of a pull down control node in response to the voltage of the pull up control node;

a boosting circuit including a boosting capacitor and configured to boost the voltage of the pull up control node;

a gate output circuit configured to output a plurality of gate signals having different timings in response to the voltage of the pull up control node and the voltage of the pull down control node; and a stabilizing circuit including a control electrode connected to a first end of the boosting capacitor, a first electrode configured to receive a first high power voltage and a second electrode connected to the first pull up control circuit, wherein the pull up control node is connected to a second end of the boosting capacitor opposite to the first end.

2. The gate driving circuit of claim 1, wherein the first pull up control circuit comprises a fourth switching element including a control electrode configured to receive the previous carry signal, a first electrode configured to receive the previous carry signal and a second electrode connected to the pull up control node.

3. The gate driving circuit of claim 2, wherein the fourth switching element comprises two transistors connected to each other in series, and wherein the second electrode of the stabilizing circuit is connected to an intermediate node of the two transistors of the fourth switching element which are connected to each other in series.

4. The gate driving circuit of claim 1, wherein the boosting circuit further comprises:

a fifteenth switching element including a control electrode connected to the pull up control node, a first electrode configured to receive a boosting clock signal and a second electrode connected to a first node; and a seventeenth switching element including a control electrode connected to the pull down control node, a first electrode configured to receive a second low power voltage and a second electrode connected to the first node, wherein the first end of the boosting capacitor is connected to the first node.

5. The gate driving circuit of claim 1, wherein a length of an active period of the boosting clock signal applied to the boosting circuit is greater than a length of an active period of a first gate clock signal applied to the gate output circuit.

6. The gate driving circuit of claim 1, wherein the pull down control circuit comprises:

a seventh switching element including a control electrode connected to the pull up control node, a first electrode configured to receive the second low power voltage and a second electrode connected to the pull down control node; and an eight switching element including a control electrode configured to receive a next carry signal which is one of carry signals of next stages, a first electrode configured to receive a second high power voltage and a second electrode connected to the pull down control node.

7. The gate driving circuit of claim 6, wherein the seventh switching element comprises two transistors connected to each other in series, and wherein the pull down control circuit further comprises a twelfth switching element including a control electrode connected to the pull down control node, a first electrode configured to receive the second high power voltage and a second electrode connected to an intermediate node of the two transistors of the seventh switching element which are connected to each other in series.

8. The gate driving circuit of claim 1, further comprising:

a reset circuit configured to initialize the pull up control node and the pull down control node in response to a fourth control signal.

9. The gate driving circuit of claim 8, wherein the reset circuit comprises:

a fifth switching element including a control electrode configured to receive the fourth control signal, a first electrode configured to receive a second high power voltage and a second electrode connected to the pull down control node; and a sixth switching element including a control electrode configured to receive the fourth control signal, a first electrode configured to receive the second low power voltage and a second electrode connected to the pull up control node.

10. The gate driving circuit of claim 1, further comprising:

a carry output circuit configured to output a carry signal in response to the voltage of the pull up control node and the voltage of the pull down control node.

11. The gate driving circuit of claim 10, wherein the carry output circuit comprises:

a sixteenth switching element including a control electrode connected to the pull up control node, a first electrode configured to receive a carry clock signal and a second electrode connected to a carry output node; and an eighteenth switching element including a control electrode connected to the pull down control node, a first electrode configured to receive the second low power voltage and a second electrode connected to the carry output node.

12. The gate driving circuit of claim 1, further comprising:

a second pull up control circuit including a control electrode configured to receive a next carry signal which is one of carry signals of next stages, a first electrode configured to receive the previous carry signal and a second electrode connected to the pull up control node.

13. The gate driving circuit of claim 1, further comprising:

a third pull up control circuit including a control electrode connected to the pull down control node, a first electrode configured to receive the second low power voltage and a second electrode connected to the pull up control node.

14. The gate driving circuit of claim 1, wherein the gate output circuit comprises:

a first-first switching element including a control electrode connected to the pull up control node, a first electrode configured to receive a first gate clock signal and a second electrode connected to a first gate output node;

a first-second switching element including a control electrode connected to the pull down control node, a first electrode configured to receive a first low power voltage and a second electrode connected to the first gate output node;

a second-first switching element including a control electrode connected to the pull up control node, a first electrode configured to receive a second gate clock signal having a timing different from a timing of the first gate clock signal and a second electrode connected to a second gate output node; and a second-second switching element including a control electrode connected to the pull down control node, a first electrode configured to receive the first low power voltage and a second electrode connected to the second gate output node.

15. The gate driving circuit of claim 14, wherein the gate output circuit further comprises:

a third-first switching element including a control electrode connected to the pull up control node, a first electrode configured to receive a third gate clock signal having a timing different from the timings of the first gate clock signal and the second gate clock signal and a second electrode connected to a third gate output node;

a third-second switching element including a control electrode connected to the pull down control node, a first electrode configured to receive the first low power voltage and a second electrode connected to the third gate output node;

a fourth-first switching element including a control electrode connected to the pull up control node, a first electrode configured to receive a fourth gate clock signal having a timing different from the timings of the first gate clock signal, the second gate clock signal and the third gate clock signal and a second electrode connected to a fourth gate output node; and a fourth-second switching element including a control electrode connected to the pull down control node, a first electrode for receiving the first low power voltage and a second electrode connected to the fourth gate output node.

16. The gate driving circuit of claim 1, further comprising:

a line selecting circuit configured to select a gate line of a stage which has a carry signal having an active level as a sensing gate line based on a first control signal.

17. The gate driving circuit of claim 16, wherein the line selecting circuit comprises:

a first sensing switching element including a control electrode configured to receive the first control signal, a first electrode configured to receive the carry signal and a second electrode connected to a certain node;

a second sensing switching element including a control electrode configured to receive a second control signal, a first electrode connected to a second electrode of a third sensing switching element and a second electrode connected to the pull up control node;

the third sensing switching element including a control electrode connected to the certain node, a first electrode configured to receive the first high power voltage and the second electrode connected to the first electrode of the second sensing switching element; and a certain capacitor including a first end configured to receive the first high power voltage and a second end connected to the certain node.

18. A gate driving circuit comprising:

a first pull up control circuit configured to control a voltage of a first pull up control node in response to a previous carry signal which is one of carry signals of previous stages;

a pull down control circuit configured to control a voltage of a pull down control node in response to the voltage of the first pull up control node;

a boosting circuit including a boosting capacitor and configured to boost a voltage of a second pull up control node;

a gate output circuit configured to output a plurality of gate signals having different timings in response to the voltage of the second pull up control node and the voltage of the pull down control node;

a stabilizing circuit including a control electrode connected to an end of the boosting capacitor, a first electrode configured to receive a first high power voltage and a second electrode connected to the first pull up control circuit; and a node separating circuit disposed between the first pull up control circuit and the boosting circuit, and including a control electrode configured to receive the first high power voltage, a first electrode connected to the first pull up control node and a second electrode connected to the second pull up control node.

19. A display apparatus comprising:

a display panel;

a gate driver configured to output a gate signal to the display panel; and a data driver configured to output a data voltage to the display panel;

wherein a gate driving circuit of the gate driver comprises:

a first pull up control circuit configured to control a voltage of a pull up control node in response to a previous carry signal which is one of carry signals of previous stages;

a pull down control circuit configured to control a voltage of a pull down control node in response to the voltage of the pull up control node;

a boosting circuit including a boosting capacitor and configured to boost the voltage of the pull up control node;

a gate output circuit configured to output a plurality of gate signals having different timings in response to the voltage of the pull up control node and the voltage of the pull down control node; and a stabilizing circuit including a control electrode connected to a first end of the boosting capacitor, a first electrode configured to receive a first high power voltage and a second electrode connected to the first pull up control circuit, wherein the pull up control node is connected to a second end of the boosting capacitor opposite to the first end.

20. The display apparatus of claim 19, wherein the first pull up control circuit comprises a fourth switching element including a control electrode configured to receive the previous carry signal, a first electrode configured to receive the previous carry signal and a second electrode connected to the pull up control node, wherein the fourth switching element comprises two transistors connected to each other in series, and wherein the second electrode of the stabilizing circuit is connected to an intermediate node of the two transistors of the fourth switching element which are connected to each other in series.

* * * * *